US011938353B2

(12) United States Patent
Lucas et al.

(10) Patent No.: US 11,938,353 B2
(45) Date of Patent: Mar. 26, 2024

(54) BODY HARNESS SYSTEM

(71) Applicants: Scott G. Lucas, Corona Del Mar, CA (US); Rosalie M. Lucas, Corona Del Mar, CA (US)

(72) Inventors: Scott G. Lucas, Corona Del Mar, CA (US); Rosalie M. Lucas, Corona Del Mar, CA (US)

(73) Assignees: Scott G. Lucas, Las Cruces, NM (US); Rosalie M. Lucas, Las Cruces, NM (US)

( * ) Notice: Subject to any disclaimer, the term of this patent is extended or adjusted under 35 U.S.C. 154(b) by 53 days.

(21) Appl. No.: 17/803,952

(22) Filed: Feb. 3, 2023

(65) Prior Publication Data

US 2023/0218933 A1 Jul. 13, 2023

Related U.S. Application Data

(63) Continuation of application No. 16/873,127, filed on Feb. 7, 2020, now Pat. No. 11,691,038.

(60) Provisional application No. 62/921,717, filed on Jul. 3, 2019.

(51) Int. Cl.
*A62B 35/00* (2006.01)
*A62B 35/04* (2006.01)

(52) U.S. Cl.
CPC ...... *A62B 35/0018* (2013.01); *A62B 35/0037* (2013.01); *A62B 35/04* (2013.01)

(58) Field of Classification Search
CPC .. A62B 35/0018; A62B 35/0037; A62B 35/04
USPC ........................................................ 182/3
See application file for complete search history.

(56) References Cited

U.S. PATENT DOCUMENTS

| | | | | |
|---|---|---|---|---|
| 3,701,395 A * | 10/1972 | Theobald | A62B 35/0018 128/845 |
| 5,487,444 A | 1/1996 | Dennington | |
| 2004/0128734 A1 | 7/2004 | Jordan | |
| 2006/0186151 A1 | 8/2006 | May | |
| 2008/0156583 A1 * | 7/2008 | Meeks | A62B 35/0068 182/9 |

(Continued)

FOREIGN PATENT DOCUMENTS

| | | |
|---|---|---|
| GB | 2482366 B2 | 9/2015 |
| KR | 10-1969385 B1 | 4/2019 |

*Primary Examiner* — Anita M King
(74) *Attorney, Agent, or Firm* — Erik M. Ahroon

(57) ABSTRACT

A body harness system includes a body harness having a first portion for providing resting position to a user. The body harness includes a plurality of belts with offset buckles connected to the body of the first portion, for supporting body of the user. A first pair of shoulder straps are connected at a first end and an undercarriage support is connected at a second end of the first portion. An abdominal support is connected to the undercarriage support via abdominal support connection straps. The undercarriage support runs from the second end of the first portion to the abdominal support, for supporting the user's groin area. The body harness system includes an elastic cord support system connected to one or more attachment rings, for controlling at least one of initial bodyweight offset, amount of bodyweight resistance, and maximum allowable downward stop for each user.

8 Claims, 7 Drawing Sheets

(56) References Cited

U.S. PATENT DOCUMENTS

| | | | | |
|---|---|---|---|---|
| 2009/0071750 | A1* | 3/2009 | Simard .............. | A62B 35/0075 182/5 |
| 2018/0015311 | A1 | 1/2018 | Gross et al. | |

* cited by examiner

BODY HARNESS SYSTEM

CROSS REFERENCE TO RELATED APPLICATION

The present application is a continuation application which claims the priority benefit of the filing date of U.S. Non-Provisional application Ser. No. 16/873,127, filed Feb. 7, 2020, the entire disclosures of which are incorporated herein by reference.

FIELD OF THE INVENTION

The invention relates generally to a body harness and, more specifically, relates to a body harness system for supporting exercise and body movement.

BACKGROUND OF THE INVENTION

Full body harnesses are used for lifting and lowering individuals in dangerous situations, and in a personal fall arrest system. Further, the full body harnesses are used for work positioning, travel restriction, ladder climbing, rescue retrieval and evacuation. The full body harness is used in an industrial setting such as the construction industry where likelihood and danger of falls from heights is both numerous and significant. Further, the full body harness is used in medical applications for treating patients that require dynamic exercise, gait training, or balance exercising during rehabilitation activities. Further, the full body harness may be used in various other applications in which total suspension and support of the body must be ensured, either expectedly or unexpectedly. Further, the full body harness is supported by a static tether line.

Currently, the full body harness has different structure/design and is made from fabric material which causes serious problems in use. The fabric material which forms lumbar support belt and thigh wraps tends to bunch up when supporting weight of a user and thus results in creating undesirable areas of high pressure in localized areas on the user's body. Further, the user's weight is not well distributed. In one case, material of the full body harness tends to pinch the skin of the user when the full body harness makes contact with the user's body. Further, belts used in the full body harness does not prevent body slippage and shoulder straps tend to squeeze shoulders of the user when suspended in the harness. Moreover, such full body harnesses restrict movement of legs of the user and therefore restrict the freedom of movement of the user.

Further, such type of body harness is very uncomfortable for seniors or aging individuals. Thus, such type of harnesses is undesirable, uncomfortable, does not provide complete fall protection, and causes many problems for users. Therefore, there is a need for an improved design of the full body harness that is comfortable, desirable, provide complete fall protection, support exercise, and free body movement.

SUMMARY OF THE INVENTION

According to embodiments illustrated herein, a body harness system is disclosed. The body harness system includes a body harness having a first portion for providing resting position to a user. The body harness includes a plurality of belts with offset buckles connected to the body of the first portion. The plurality of belts provide support to the body of the user. Further, a first pair of shoulder straps are connected at a first end of the first portion. Further, an undercarriage support is connected at a second end of the first portion. Further, an abdominal support is connected to the undercarriage support via abdominal support connection straps. Further, the abdominal support connection straps are connected to a second pair of straps. Thereafter, the undercarriage support runs from the second end of the first portion to the abdominal support, for providing support to user's groin area.

According to another embodiment illustrated herein, a body harness system is disclosed. The body harness system includes a body harness having a first portion for providing resting position to a user. The body harness includes or more attachment rings at the back. The body harness includes a plurality of belts with offset buckles connected to the body of the first portion. The plurality of belts provide support to the body of the user. Further, a first pair of shoulder straps are connected at a first end of the first portion. Further, an undercarriage support is connected at a second end of the first portion. Further, an abdominal support is connected to the undercarriage support via abdominal support connection straps. Further, the abdominal support connection straps are connected to a second pair of straps. Thereafter, the undercarriage support runs from the second end of the first portion to the abdominal support, for providing support to user's groin area. The body harness system further includes an elastic cord support system connected to one or more attachment rings, for controlling at least one of factors such as, but are not limited to, initial bodyweight offset, amount of bodyweight resistance, and maximum allowable downward stop for each user.

According to another embodiment illustrated herein, a method of operating a body harness comprising a first portion, an undercarriage support, and an abdominal support. The method comprising permitting a user to hear the body harness to wear the body harness and if the user is held in suspension by the body harness, then the undercarriage support provides support to the user. The support provided by the undercarriage support enables a portion of the weight of the user to be borne by the body harness while the user is held in suspension from the structure of the body harness.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

Various embodiments will hereinafter be described in accordance with the appended drawings, which are provided to illustrate and not to limit the scope in any manner, wherein similar designations denote similar elements, and in which.

DETAILED DESCRIPTION OF THE PREFERRED EMBODIMENT

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
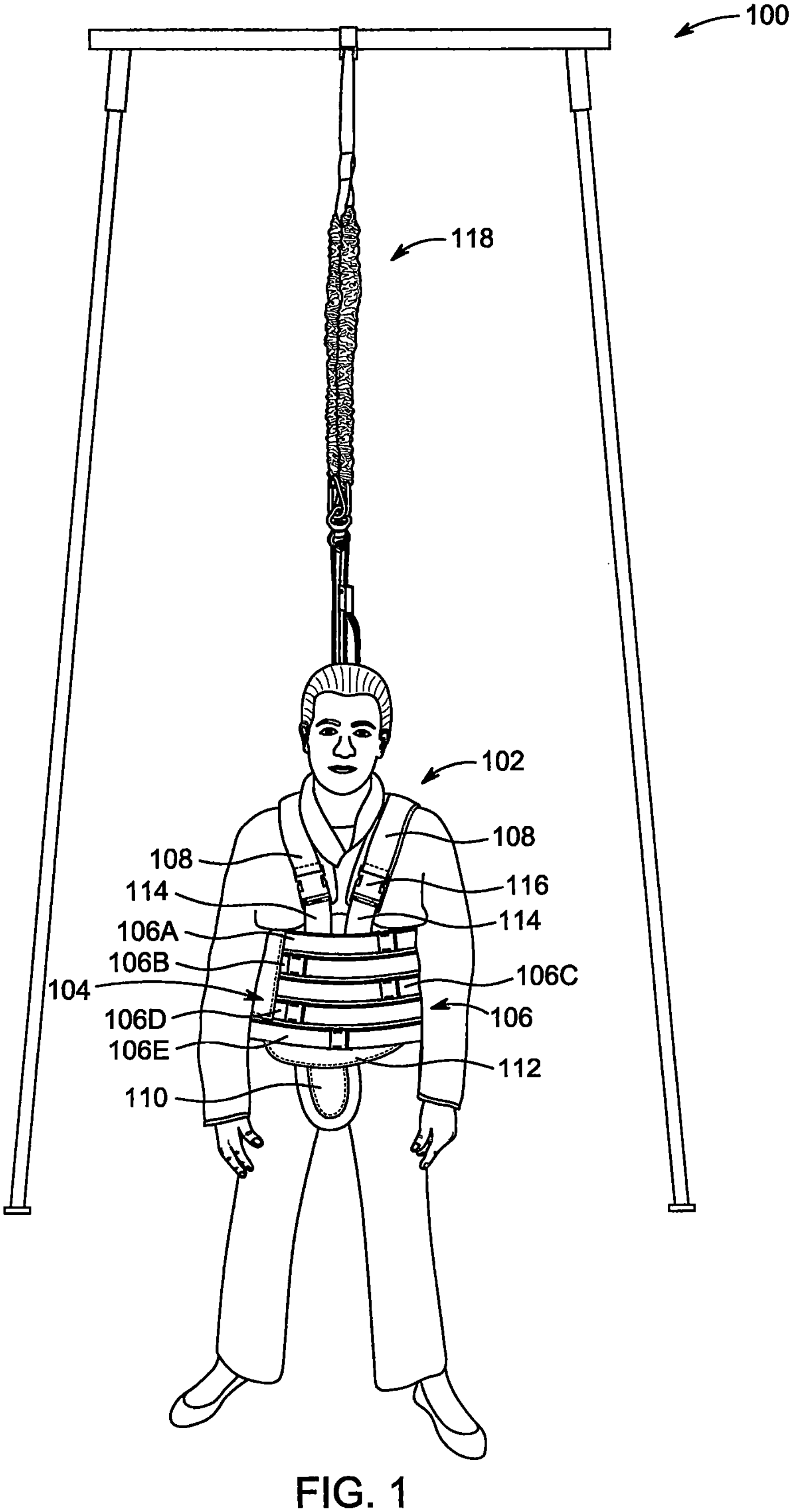
FIG. 1 illustrates a schematic of a front view of a body harness system 100, where a body harness 102 is being worn by a user, in accordance with at least one embodiment.

FIG. 1 illustrates a schematic of a front view of a body harness system 100, where a body harness 102 is being worn by a user. The body harness 102 may include a first portion 104, a plurality of belts 106, a first pair of shoulder straps 108, an undercarriage support 110, an abdominal support 112, and a second pair of straps 114. The detailed description of the body harness 102 is described in conjunction with FIGS. 2, 3A, 3B, and 4.

Figure 2:
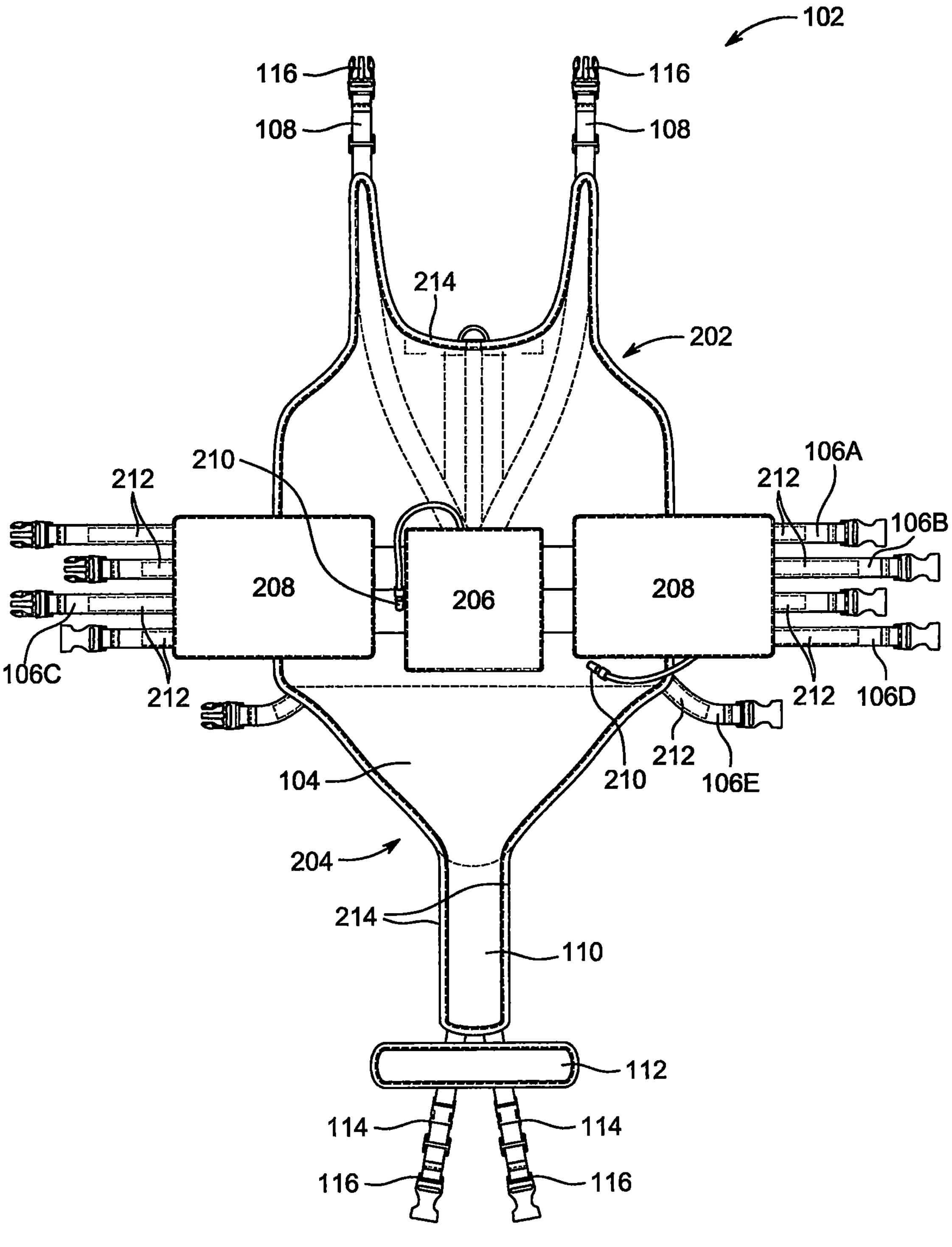
FIG. 2 illustrates a front view of the body harness 102, in accordance with at least one embodiment.

The first portion 104 of the body harness 102 may be used to provide resting position to the user. The first portion 104 may correspond to a built-in seat portion. Further, at least one of the plurality of belts 106 may be connected at the back of the first portion 104. It should be noted that the plurality of belts 106 may be buckled around the body of the user and may provide support to the body of the user. The plurality of belts 106 may include at least one attached belt and at least one floating belt. In one embodiment, the plurality of belts 106 may correspond to five belts (106A, 106B, 106C, 106D, 106E) with offsetting buckles which are designed to provide maximum support for every body type (i.e., body shape) of the user. In particular, the belts 106A, 106B, and 106D may be attached to sides of the body harness 102, at the first portion 104, as shown in FIG. 2. Further, the belts 106A, 106B, and 106D may be tightened at specific points such as at the waist, just above the waist at the beginning of rib-cage, just below the breast, and mid rib-cage. It should be noted that such points lie just below natural expansions of the body. In one case, the belt 106D may be referred to as an abdominal support belt.

As shown in FIG. 2, the belt 106C may be inserted in the first portion 104. Further, the belt 106C may have loops on the inside of the first portion 104, and thus may allow the belt 106C to run on an inner side of the first portion 104. Further, one of the belts 106 may wrap around the hip of the user and may provide support to users with a belly. Further, the waist may be the narrowest part of the body, and a belt at the base of the rib cage has the ribs and the expansion of the latissimus dorsi muscles just above it. Further, the belt 106E may be referred to as a floating belt, and may move up and down freely across the body harness 102. The belt 106E may be designed to provide additional support and tightening at a specific point that works best for each user. The floating belt may support the user in the most supportive area of the mid-section of the body for each user.

Further, the body harness 102 may include the first pair of shoulder straps 108 connected at a first end 202 (shown in FIG. 2) of the first portion 104. The first end 202 may correspond to an upper end of the first portion 104. It should be noted that such connection may be reinforced connection, without departing from the scope of the disclosure. Further, the undercarriage support 110 may be connected at a second end 204 i.e., other end (shown in FIG. 2) of the first portion 104. The second end 204 may correspond to a lower end of the first portion 104. It should be noted that the undercarriage support 110 runs from the second end 204 of the first portion 104 to the abdominal support 112, for providing support to the user's groin area. The undercarriage support 110 may be further connected to the abdominal support 112 via abdominal support connection straps 302 (shown in FIG. 3A). The abdominal support connection straps 302 may be provided with buckles 304 and may be adjustable, without departing from the scope of the disclosure.

In one embodiment, the abdominal support 112 may be provided with buckles 306 (shown in FIG. 3A), which further get connected to the belt 106D that is buckled around the body of the user. In one example, the belt 106D may be buckled around the waist of the user. It should be noted that the belt 106D may be attached at the back of the abdominal support 112, via the buckles 306. Further, the abdominal support connection straps 302 may be connected to the second pair of straps 114. It should be noted that such connection may be reinforced connection, without departing from the scope of the disclosure. Thereafter, the second pair of straps 114 may be connected to the first pair of shoulder straps 108, for securing the user in the body harness 102. The first pair of shoulder straps 108 and the second pair of straps 114 may be connected using buckles 116.

It should be noted that the above-mentioned connection of the first pair of shoulder straps 108 and the second pair of straps 114 has been provided only for illustration purposes. It will be apparent to one skilled in the art that the plurality of belts 106 may be attached to the body harness 102 using at least one of buckles, VELCRO, buttons, or zipper, without departing from the scope of the disclosure.

As shown in FIG. 2, the first portion 104 may be integrated with an inflatable pad 206 for supporting lumbar of the user. The inflatable pad 206 may provide a good posture and more secure fit by filling the gap between the lumbar spine of the user and the first portion 104, supporting the natural inward curve of the lower back of the user. The inflatable pad 206 may be square in shape, as shown in FIG. 2. It should be noted that the inflatable pad 206 may be of some other shape as well, without departing from the scope of the disclosure. Further, the first portion 104 may be integrated with one or more inflatable pads 208 placed at one or more sides of the first portion 104. The one or more inflatable pads 208 may be attached or incorporated into the first portion 104 to allow for a custom tightened fit and support for the user. The one or more inflatable pads 208 may be rectangular in shape, as shown in FIG. 2. It should be noted that the one or more inflatable pads 208 may be of some other shape as well, without departing from the scope of the disclosure.

Further, the inflatable pad 206 and the one or more inflatable pads 208 may be connected to at least one valve 210, as shown in FIG. 2. The at least one valve 210 may be further connected to an air pump (not shown), which is used by the user for inflating or deflating the inflatable pad 206 and the one or more inflatable pads 208, as per the user's requirements. It should be noted that the inflatable pad 206 and the one or more inflatable pads 208 may be attached to the first portion 104 using at least one of VELCRO, buttons, or other fastening means, without departing from the scope of the disclosure. In one embodiment, the plurality of belts 106 may be integrated with an inflatable material 212 for tightening the body harness 102 to the body of the user. The inflatable material 212 may be inflated in accordance with the comfort to the user. It will be apparent to one skilled in the art that the above-mentioned placement of the inflatable pad 206, one or more inflatable pads 208, and the inflatable material 212 have been provided only for illustration purposes, without departing from the scope of the disclosure.

As shown in FIG. 2, the body harness 102 may include neoprene rolls or pads at one or more touch points 214, where the body harness 102 makes contact with the body of the user. In one embodiment, the first pair of shoulder straps 108 and the second pair of straps 114 may be covered with thick neoprene shoulder pads. The neoprene rolls or pads may provide soft cushioning and protect highly sensitive skin of the users, especially senior citizens. It should be noted that the body harness 102 may be made of rip proof canvas. In another embodiment, the body harness 102 may be made from materials such as, but are not limited to, rip proof nylon, rip-proof polyester, or rip-proof cotton blend.

Figure 3A:
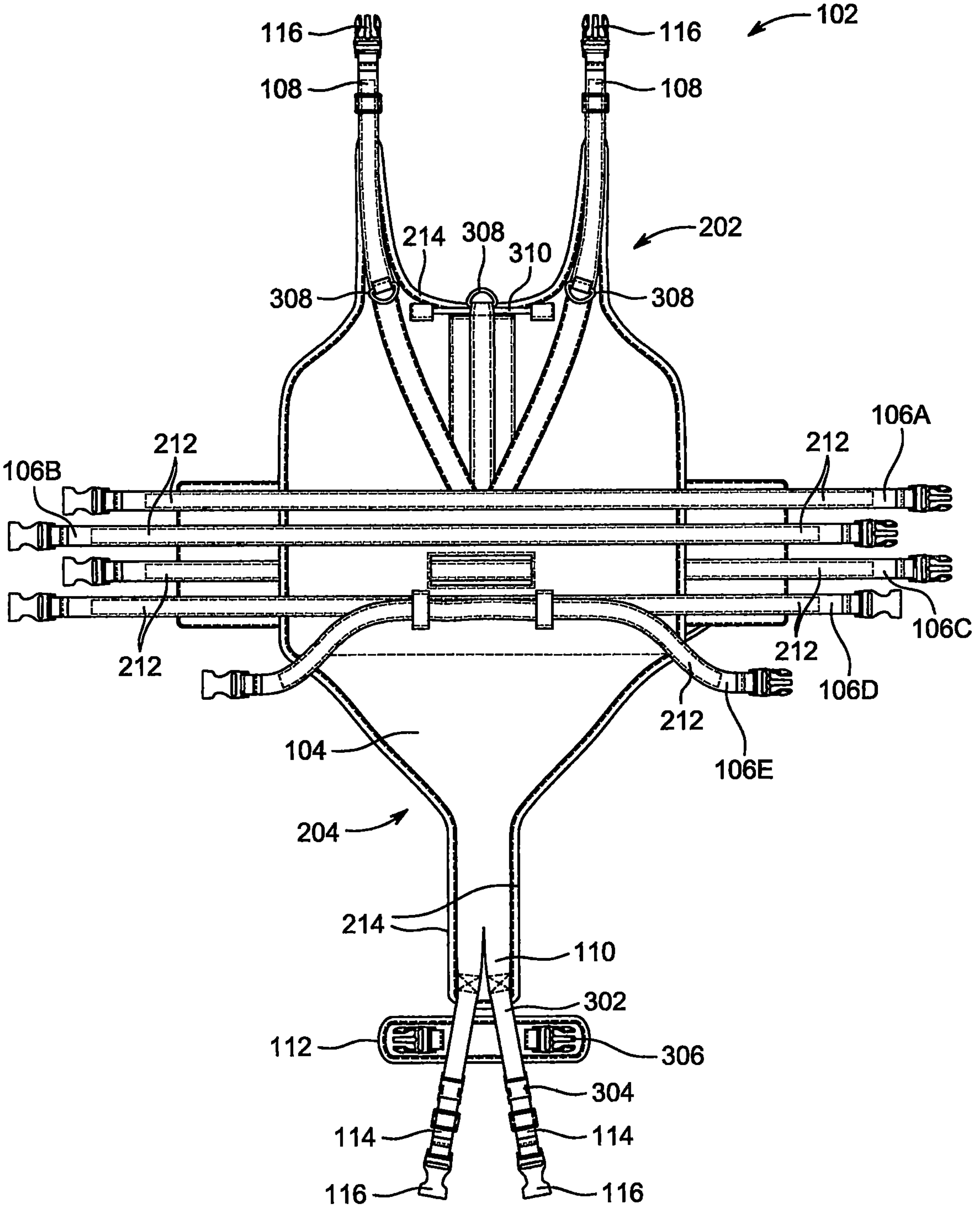
FIG. 3A illustrates a rear view of the body harness 102, in accordance with at least one embodiment.
Figure 3B:
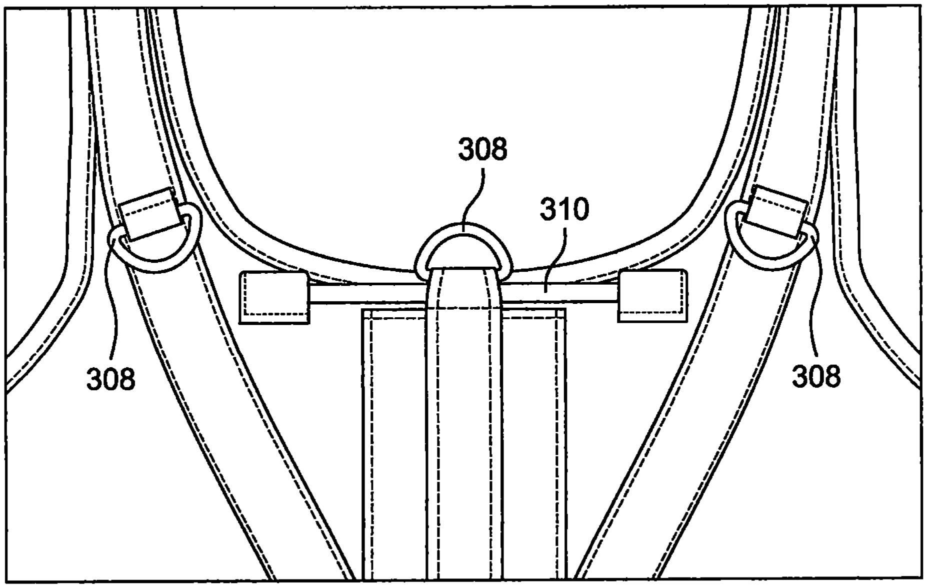
FIG. 3B illustrates a rear view of the body harness 102 showing one or more attachment rings 308 and a rod 310, in accordance with at least one embodiment.

As shown in FIGS. 3A and 3B, the first portion 104 of the body harness 102 may be provided with one or more attachment rings 308. In one embodiment, the one or more attachment rings 308 may be attached at the back of the first portion 104. The one or more attachment rings 308 may be used for attaching an elastic cord support system 118. The elastic cord support system 118 may be used for controlling at least one of factors such as, but are not limited to initial bodyweight offset, amount of bodyweight resistance, and maximum allowable downward stop for each user.

The bodyweight offset may be defined as an amount of bodyweight the body harness system 100 pulls against a user when the user is in a standing position. Further, the bodyweight resistance may be defined as the amount of pull against the user's bodyweight the body harness system 100 introduces as the user moves toward a sitting position. Further, the allowable downward stop may be defined as the drop level at which the user cannot go below. Such factors may be controlled to provide optimal level of support for any type of user. The type of user may be based on user's fitness, body weight, body type, body height, rehabilitation, or other factors related to the user.

Further, the one or more attachment rings 308 may be assisted by a rod 310. The rod 308 may be used for strengthening multiple connection points of the body harness 102 and may disperse downward forces on the body harness 102 across the whole top of the body harness 102. It should be noted that the multiple connection points for the body harness 102 i.e., upper-back, shoulders, and front waist. Further, the rod 310 may be a carbon rod or a steel rod or an aluminum rod. The rod 310 may further be reinforced to the back of the body harness 102, as shown in FIG. 3B. In one embodiment, the rod 310 may serve from an upper back connection point of the body harness 102, as shown in FIG. 3B. Due to the presence of the rod 310, the elastic cord support system 118 may pull a wider section of the body harness 102, maintaining its integrity. Such usage of the rod 310 may disperse pull force of the elastic cord support system 118, across the body harness 102.

Figure 4:
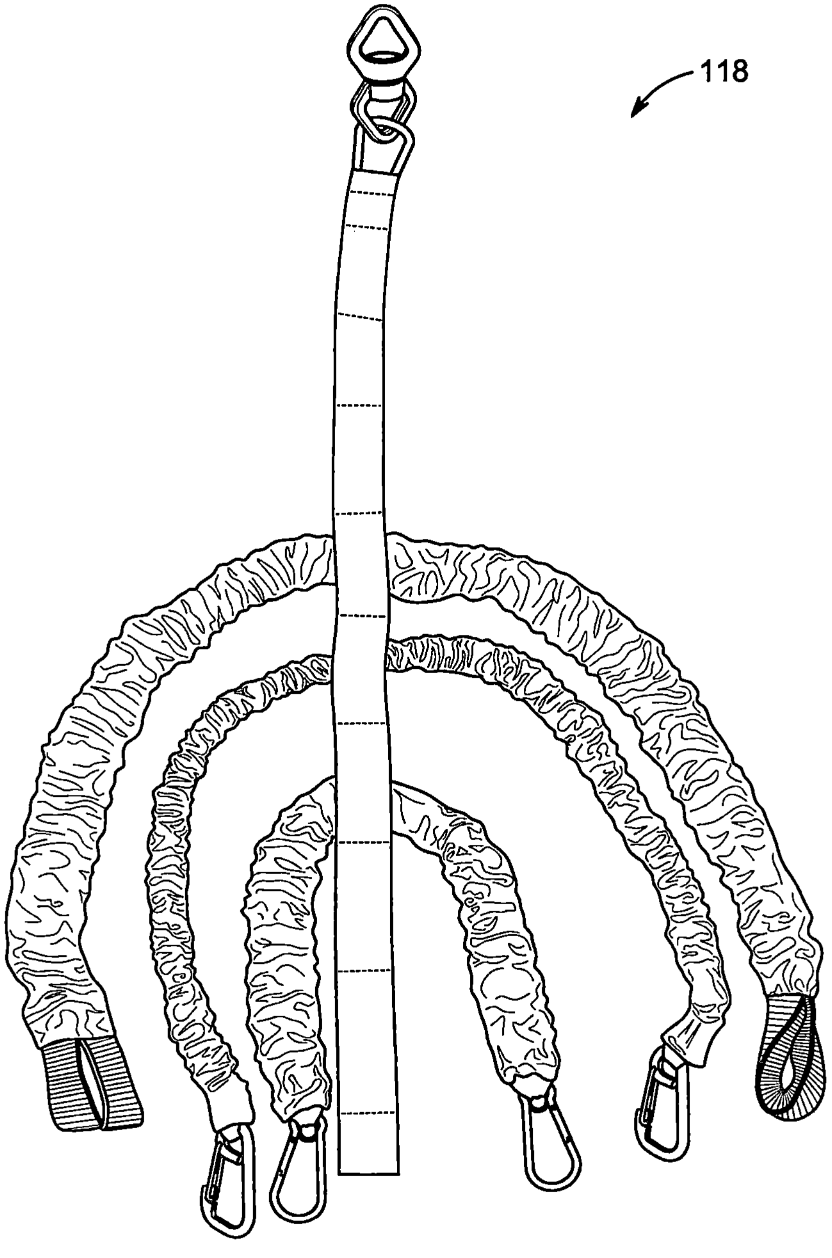
FIG. 4 illustrates one or more components of an elastic cord support system 118, in accordance with at least one embodiment.

Further, the elastic cord support system 118 may allow the user to easily hook and unhook from the body harness 102. As shown in FIG. 4, the elastic cord support system 118 may correspond to a swiveling cord system which uses a daisy chain, a swiveling cam strap, bungee cords, a swivel, and shock cords (i.e., elastic shock cords) of varying lengths and resistances. The daisy chain may allow the shock cords to be attached at the right height for the proper adjustments. Further, the daisy chain may allow the shock cords to be doubled up in order to increase the bodyweight offset and/or resistance. It should be noted that there are hundreds of potential setting combinations available based upon differing lengths of the shock cords, different positioning of the shock cords in the daisy chain, and differing resistance levels provided by thicker cords.

Further, the swiveling cam strap may allow easy connection of the body harness 102 to the shock cords. Further, the swiveling cam strap may be easily tightened once connected to the body harness 102 to implement the desired the bodyweight offset. Further, the swiveling cam strap may be used for a quick disconnect of the body harness 102. On the other hand, the swivel may allow the daisy chain to remain static despite any turning movements made by the user. Such twisting of the shock cords may affect each of the initial setting factors. It should be noted that the elastic cord support system 118 may be adjustable based on the type of the user and requirements of the user, without departing from the scope of the disclosure.

Figure 5:
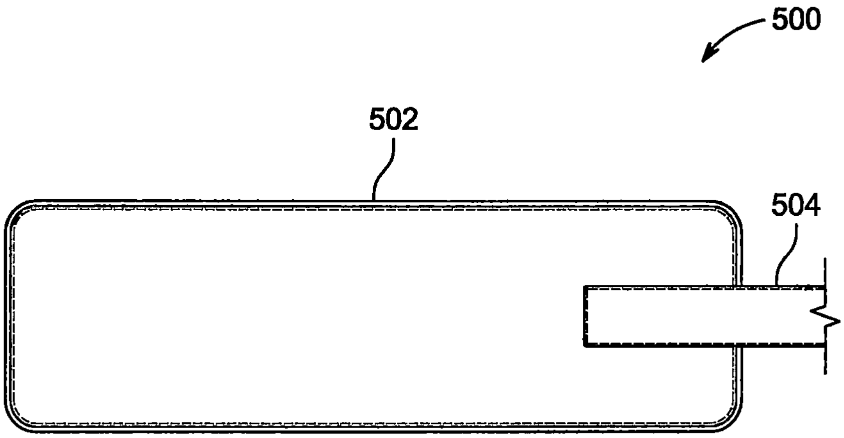
FIG. 5 illustrates a chest pad 500, in accordance with at least one embodiment.

FIG. 5 illustrates a chest pad 500, in accordance with at least one embodiment. FIG. 5 is described in conjunction with FIGS. 2, 3A, 3B, and 4. The chest pad 500 may comprise of a flat padded surface 502 and a fastener 504. The chest pad 500 may be worn by the user, prior to wearing the body harness 102, in a manner that the chest pad 500 may be wrapped around the chest of the user. The chest pad 500 may add comfort for the user and may protect the user from any pressure points in the body harness 102. In one case, the chest pad 500 may be wrapped around the torso of the user to provide greater comfort and to protect users clothing. The chest pad may be inflatable. Further, the inflatable pad 206 and the one or more inflatable pads 208 of the body harness 102 may push against the chest pad 500, thus creating a secure fit. The fastener 504 of the chest pad 500 may comprise two stretchable VELCRO straps, fixed at one end of the chest pad 500 and available to be connected to another end of the chest pad 500. It should be noted that the size of the chest pad 500 may be 30-40 inches long and 8-10 inches wide, without departing form the scope of the disclosure.

Figure 6:
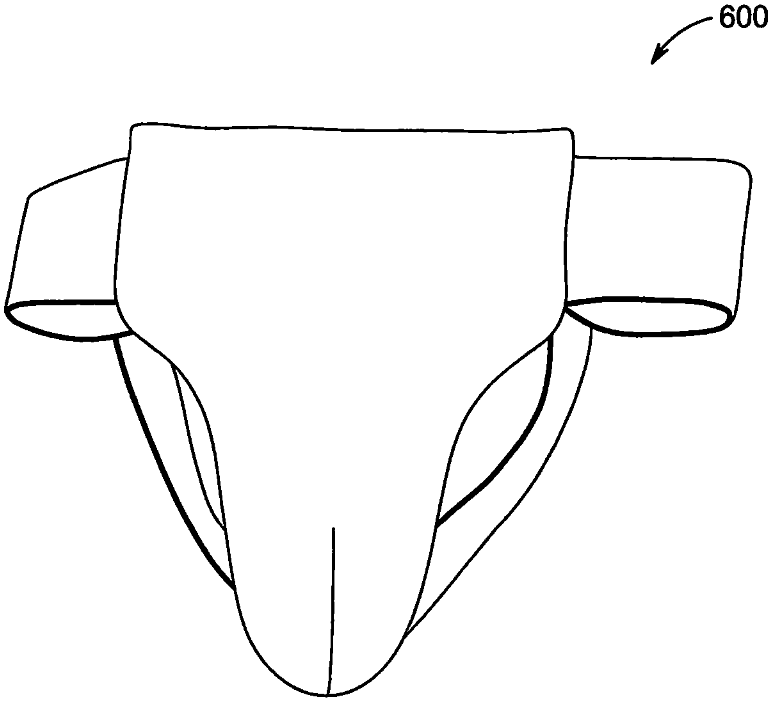
FIG. 6 illustrates a groin protector 600, in accordance with at least one embodiment.

FIG. 6 illustrates a groin protector 600, in accordance with at least one embodiment. FIG. 6 is described in conjunction with FIGS. 2, 3A, 3B, and 4. The groin protector 600 may be made of a plastic cup surrounded by an outside padding, designed to protect the male genitalia. The groin protector straps may be made of a stretchable material in order for easy fitting of the groin protector 600. The groin protector 600 may be made in a diaper-like shape, as shown in FIG. 6. The groin protector 600 may be worn by the user, prior to wearing the body harness 102, in a manner that the groin protector 600 may fit around the groin area of the user. The groin protector 600 may provide additional support to the groin area of the user, while using the body harness 102. In addition, the groin protector 600 may provide more comfort, when an upward pressure of the undercarriage support 110 is experienced.

Figure 7:
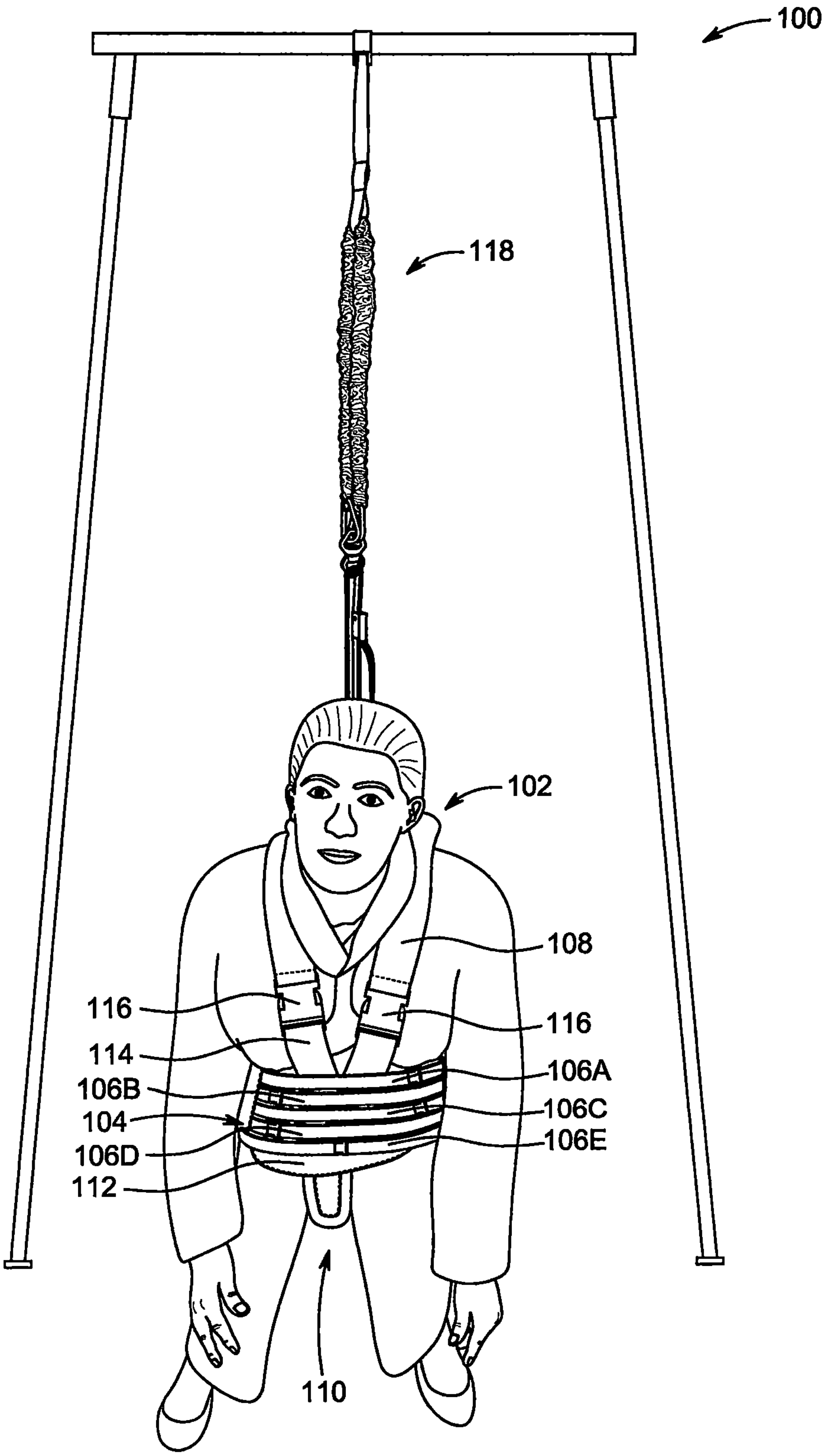
FIG. 7 illustrates a scenario of the body harness system 100 (i.e., the body harness 102 and the elastic cord support system 118), in accordance with at least one embodiment.

FIG. 7 illustrates a scenario of the elastic cord support system 118, in accordance with at least one embodiment. FIG. 7 is described in conjunction with FIGS. 1, 2, 3A, 3B, and 4.

As shown in FIG. 7, the body harness 102 may be worn by the user and allow the user to perform certain exercises. When the user performs the exercises, the body harness system 100 (i.e., the body harness 102 and the elastic cord support system 118) may provide the user a stable position. For one instance, if the user is about to fall, the body harness system 100 may take control of weight of the user and protect the user from falling. In another instance, the body harness system 100 may further control the weight of the user by controlling the at least one of the factors such as, but are not limited to, the initial bodyweight offset, the amount of bodyweight resistance, and the maximum allowable downward stop for each user.

According to an example embodiment, a method of operating the body harness 102 comprising the first portion 104, the undercarriage support 110, and the abdominal support 112. The method may comprise permitting the user to hear the body harness 102 to wear the body harness and if the user is held in suspension by the body harness 102, then the undercarriage support 110 provides support to the user. The support provided by the undercarriage support 110 enables a portion of the weight of the user to be borne by the body harness while the user is held in suspension from the structure of the body harness 102.

The disclosed embodiments encompass numerous advantages. Various embodiments of body harness system have been disclosed. The body harness system includes a body harness having first portion. The first portion may correspond to a built-in seat portion and may provide resting position to the user. Further, the body harness includes an undercarriage support attached to a belt in order to assure complete fall protection of the user. Further, soft, stretch neoprene rolls placed at all touch points of the body harness for cushioning and protecting the highly sensitive skin of seniors. Further, the plurality of belts and the offset buckles for the plurality of belts are used for highly contoured fit and reduces any body-slippage of the user from the body harness. Further, the design of the body harness allows the users for total free range of motion for legs, hips, arms, and shoulders.

Further, the body harness system includes an adjustable elastic cord support system that is used to control the initial bodyweight offset, the amount of bodyweight resistance, and the maximum allowable downward stop for each user. Further, the body harness system allows the user to instantaneously go from body weight assistance to bodyweight resistance for supporting exercise and free body movement. It should be noted that a swiveling cam connection system allows the users to rotate freely during exercise and to easily hook to, and unhook from the body harness. Further, the use of the rod 310 may provide better comfort and may prevent the body weight to be pulled up from the middle of the harness by dispersing any upward pressure across the width of the harness, preventing the sides of the body harness from sagging. Further, the body harness system is designed for supporting therapeutic exercise and body movement. The body harness system is designed to create an individually customized mobility and strength training capability for the users. Such body harness system is helpful for aging individuals to recover quickly from injuries, and regain, maintain, or improve strength, balance, and range of motion.

Further, the body harness system allows seniors to comfortably exercise to their maximum capabilities without any fear or risk of falling. Thus, such type of body harness system allows the seniors to at least maintain and/or extend their strength, mobility, independence, and longevity. Therefore, such design of the body harness system (i.e., the body harness and the elastic cord support system) is optimal and results in increasing harness performance and comfort for the user.

The features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope.

Features that are described and/or illustrated with respect to one embodiment may be used in the same way or in a similar way in one or more other embodiments and/or in combination with or instead of the features of the other embodiments.

While the preferred embodiment of the present invention has been illustrated and described, as noted above, many changes can be made without departing from the spirit and scope of the invention. For example, aspects of the present invention may be adopted on alternative operating systems. Accordingly, the scope of the invention is not limited by the disclosure of the preferred embodiment. Instead, the invention should be determined entirely by reference to the claims that follow.

What is claimed is:

1. A body harness system comprising:

a body harness having:

- a first, portion for providing resting position to a user, wherein the first portion comprises a rod attached at a back of the first portion;
- one or more attachment rings attached at the back of the first portion;
- a plurality of belts with offset buckles connected to a body of the first portion, the plurality of belts provide support to the body of the user;
- a first pair of shoulder straps connected at a first end of the first portion;
- an undercarriage support connected at a second end of the first portion, wherein the undercarriage support runs from the second end of the first portion to an abdominal support, for providing support to user's groin area;
- the abdominal support connected to the undercarriage support via abdominal support connection straps;

a second pair of straps connected to the abdominal support connection straps; and an elastic cord support system connected to the one or more attachment rings, for controlling at least one of initial body weight offset, amount of bodyweight resistance, and maximum allowable downward stop for each user, wherein the elastic cord support system is connected to the first portion by a swiveling cam strap or a bungee cord, wherein the rod is configured to disperse pull force of the elastic cord support system, across the body harness.

2. The body harness system of claim 1, wherein the plurality of belts comprises at least one attached belt and at least one floating belt.

3. The body harness system of claim 1, wherein the rod comprises at least one of a carbon rod or a steel rod or an aluminum rod.

4. The body harness system of claim 1, wherein the first portion comprises one or more inflatable pads are attached or incorporated into the first portion to allow for a custom tightened fit and support for the user.

5. The body harness system of claim 4, wherein the one or more inflatable pads placed at one or more sides of the first portion to allow for a custom tightened fit and support for the user.

6. The body harness system of claim 4, wherein the one or more inflatable pads is connected to at least one value of an air pump.

7. The body harness system of claim 1, wherein the elastic cord support system corresponds to a swiveling cord system which uses a daisy chain, the swiveling cam strap, the bungee cord, a swivel, and shock cords of varying lengths and resistances.

8. A. method of operating a body harness comprising a first portion, an undercarriage support, an elastic cord support system, and an abdominal support, the method comprising:

permitting a user to wear the body harness by buckling a plurality of belts of the first portion around a body;

permitting the user to connect the undercarriage support to the abdominal support via an abdominal support connection straps, for providing support to the user's groin area; and if the user is held in suspension by the body harness, then the undercarriage support provides support to the user, so that at least a portion of the weight of the user is borne by the body harness while the user is held in suspension from the structure of the body harness, wherein the first portion comprises one or more attachment rings, connected to an elastic cord support system, for controlling at least one of initial bodyweight offset, amount of bodyweight resistance, and maximum allowable downward stop for each user, and wherein the elastic cord support system is connected to the first portion by a swiveling cam strap or a bungee cord.

* * * * *